(No Model.) 2 Sheets—Sheet 1.
J. C. LESLIE.
HORSE POWER.
No. 562,006. Patented June 16, 1896.
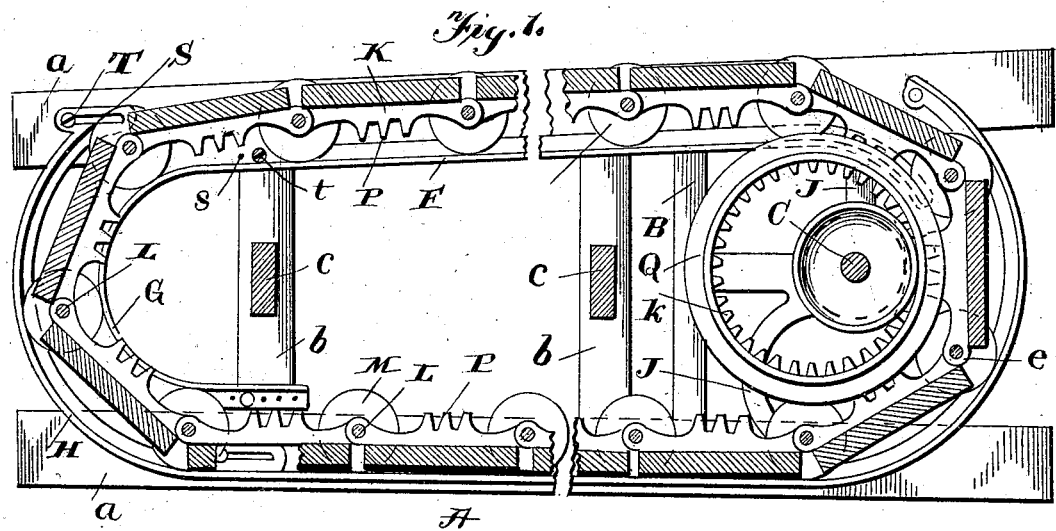
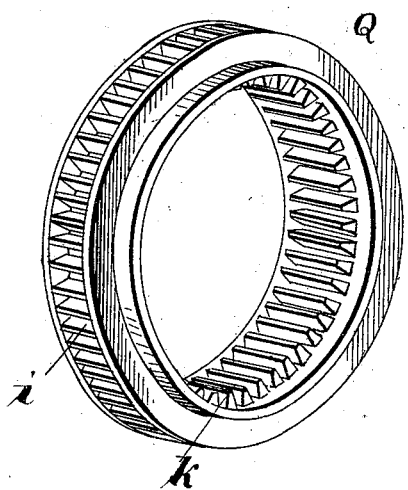
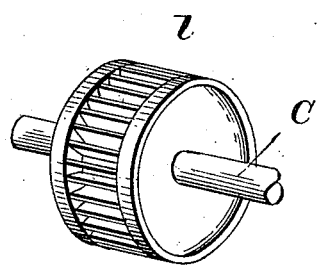
Witnesses
Geo. E. Frech.
James W. Bevans
Inventor
J C Leslie
By Attorney
C. E. Allen (No Model.) 2 Sheets—Sheet 2.

J. C. LESLIE.
HORSE POWER.

No. 562,006. Patented June 16, 1896.

Witnesses
Geo. E. Fitch
James W. Bevans

Inventor
J. C. Leslie
By Attorney
C. E. Allen

UNITED STATES PATENT OFFICE.

JOSEPH C. LESLIE, OF ST. ALBANS, VERMONT.

HORSE-POWER.

SPECIFICATION forming part of Letters Patent No. 562,006, dated June 16, 1896.

Application filed January 20, 1896. Serial No. 576,185. (No model.)

*To all whom it may concern:*

Be it known that I, JOSEPH C. LESLIE, a citizen of the United States, residing at St. Albans, in the county of Franklin and State of Vermont, have invented certain new and useful Improvements in Horse-Powers; and I do hereby declare the following to be a full, clear, and exact description of the invention, such as will enable others skilled in the art to which it appertains to make and use the same.

My invention relates to improvements in horse-powers; and it pertains to that class of powers which utilize an incline plane upon which the animal or animals walk for moving the said plane.

The primary object of my invention is to provide a movable incline power with lag-irons, jointed and provided, respectively, with cog-teeth upon their inner faces which engage a floating or shell gear, the latter inclosing a pinion upon a driving-shaft, the said lag-irons surrounding or lapping around so as to engage the floating-wheels at several points around its surface, thus causing always a firm engagement with and a support for the shell or floating gear.

A further object is the peculiar form of lag irons or links, whereby a center draft is provided, preventing the endwise movement of the rods, which extend across and unite the lag-irons at opposite sides of the incline plane, which center draft reduces friction, and to so shape the lag-irons that they will receive and hold the lag wood or planks upon which the animal or animals tread.

A further object of my present invention relates to the specific construction of certain parts of the machine for the purposes fully explained hereinafter.

Figure 2:
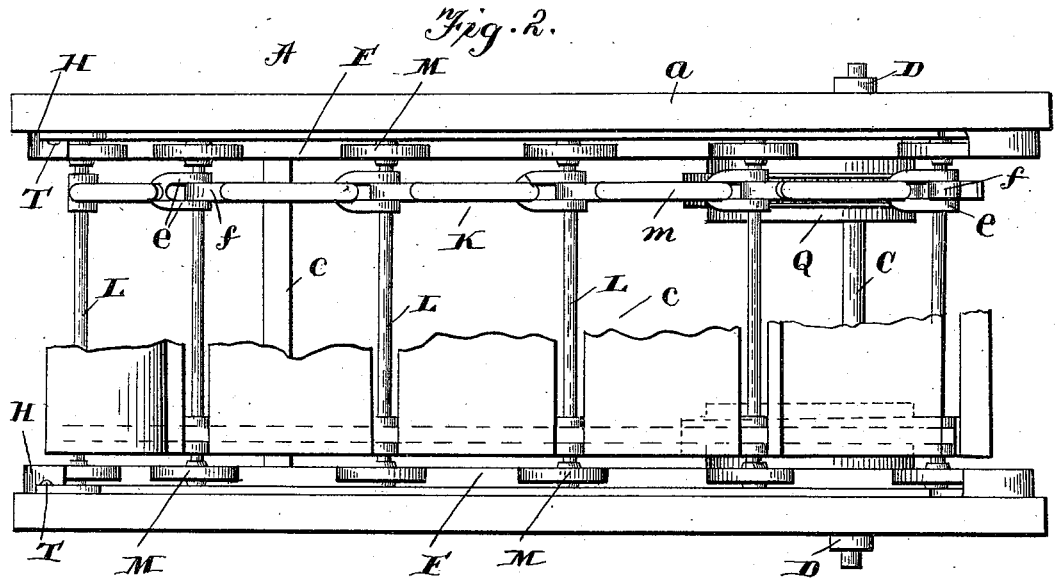
Figure 4:
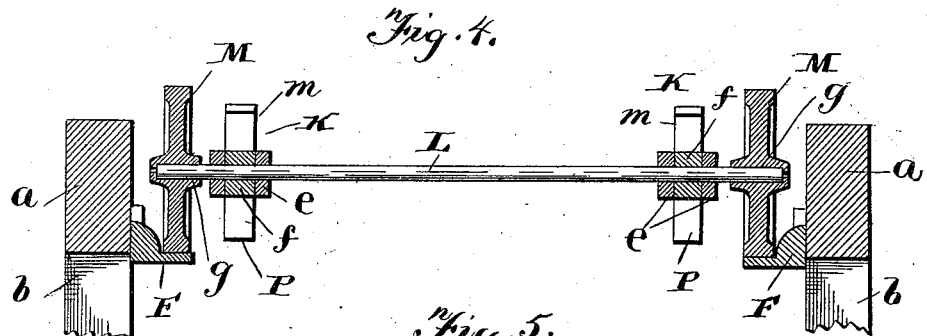
Figure 5:
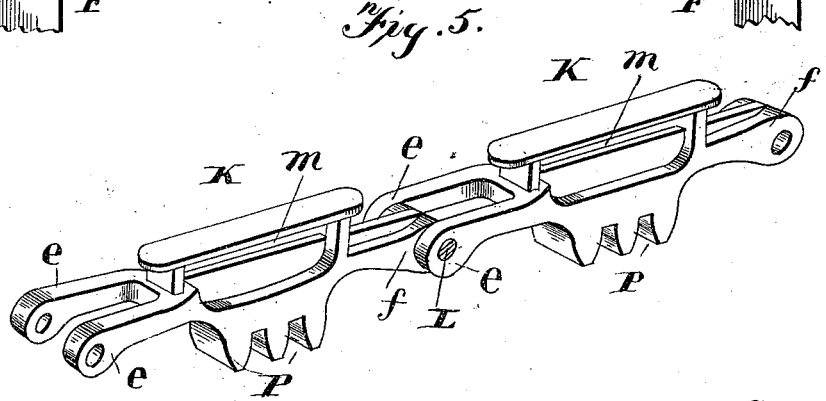

In the accompanying drawings, Figure 1 is a vertical longitudinal sectional view of my invention. Fig. 2 is a top plan view of the same. Fig. 3 is a detached perspective view of one of the floating or shell gear. Fig. 4 is a sectional view through the connecting-rods and their supporting-wheels, taken longitudinal the said rods. Fig. 5 is a detached view of two of the lag-irons connected together. Fig. 6 is a detached perspective view of the flanged pinion carried by the driving-shaft.

A indicates a frame having top and bottom bars $a$, united by the vertical bars $b$, the latter being connected with the transverse bars $c$. These longitudinal bars are connected to form the upper longitudinal bars on an incline, and supported between the longitudinal bars at the highest end at each side of the frame are the castings B, which receive a driving-shaft C in the journals or boxes D, formed upon said castings.

At the inner side of the frame is supported the railway F, upon which the supporting-wheels run, as will be presently described. This railway, at the end opposite the castings before referred to, is in circular form, as shown at G, forming a loop or U-shaped end, as clearly shown. The rail just referred to is what may be termed the "inner" rail, and at the narrower end of the frame which has just been referred to there is an outer railway H, having its upper end beginning at the curve of the inner railway before referred to and extending around parallel therewith to the opposite end of the machine and around up the opposite end of the machine, the curved end of the said outer railway being supported by the webs or wings J, which extend inward and form a part of the bearing for the driving-shaft. This outer railway is bolted to the lower longitudinal sill of the frame, which is its main support, and the upper ends of the said railway are likewise bolted to the upper longitudinal plate of the frame, thus forming a rigid support and a firm manner of attaching it to the frame.

The movable plane of my power consists of the lag-irons K, one end of each lag-iron having the two projecting perforated ears $e$, and the opposite end of each lag-iron having the single projecting perforated ear $f$. The object of this is to have the single ear project between the double ears of the opposite end of the lag-iron, and through these the shafts or bars L pass freely and their ends are supported by the wheels M outside of the said lag-irons and resting upon and engaging the railways before described. This provides a central draft upon each side of the movable plane upon the said lag-irons as compared with the form now usually employed, which makes an easier running machine on account of a reduction in friction, as will be readily understood. The wheels M, as shown in the detached sectional view, have the inner ends of their journals or openings $g$ larger than the outer ends of the openings, or, in other words, the outer ends of the openings are reduced and the shafts or bars are correspondingly shaped. This prevents any endwise movement of the bars or rods, from the fact that the wheels have their outer edges engage the side flange of the railways. This construction makes a very simple and efficient means of holding the rods or bars in position without the use of screws, rivets, or other additional construction, which is expensive and not so reliable.

The essential feature of my invention, as before stated, consists in using, in connection with this movable plane consisting of the lag-irons with the teeth P on their inner sides, a floating or shell gear Q, having on their outer peripheries the cogs $i$, inclosed between a flange, forming what may be termed a "box-gear," the teeth of the lag-irons entering them between the flanges or box portion, so that the floating or shell gears are held in their proper relative positions. The lag-irons engage at all times the said shell-gears at several points around its circumference, as clearly shown in Fig. 1. The shell-gears are made of a diameter so that its curvature or circular shape corresponds, preferably, with the curve of the inner railway before described, and they are placed preferably with their outer periphery about parallel with the adjacent curved ends of the inner railway and corresponding with the adjacent ends of the outer curved railway. In this manner the lag-irons surround the outer peripheries of the shell or ring-like gears, thus supporting them independent of any other means of support, which in operation produces the roller-bearing principle, which is a great reduction in friction. The inner sides of these floating, shell, or ring-like gears are provided with the teeth $k$, which engage the teeth of a box-pinion $l$, which is rigidly secured to each end of the driving-shaft within the frame of the machine.

Thus far I have described only a single shell or floating gear, while there will be one, preferably, at each side of the machine, though not necessarily so. In connection with the said box-pinion the lag-irons support the shell or ring-like gears in what may be appropriately termed a "floating" condition, so that they roll around the pinions and effect a great reduction in friction, and this construction also enables me to increase or diminish the speed of the driving-shaft by the relative size of the pinion and shell-gear on the same principle as the speed is regulated in gears of other constructions.

The upper or outer sides of the lag-irons are provided with the loops $m$, and the ends of the lag wood or planks are slotted to receive these loops, so that no other connection is necessary than simply to place these in position upon the lag-irons, though, if necessary, they may be riveted or screwed when placed in that position.

In horse-powers it is very essential that there should be some means of taking up the wear of the movable plane, and this I accomplish by means of the movable loop or circular portion $n$ of the inner railway at that end of the machine opposite from the gearing. This is accomplished by having the ends of this loop or curved portion of the inner railway provided with a series of openings $s$, through which the securing-bolts $t$ pass, so that it may be moved endwise, and the corresponding end of the outer railway is slotted, as shown at S, through which slot the clamping-bolt T passes, so that it may be correspondingly adjusted.

By means of a power of this construction the great friction is greatly diminished and the wear of the machine is considerably less. It is necessary in these constructions to provide means for taking up the wear, which I have done in my invention, and I have produced a speed-gearing with a single shaft which I consider of utility in this class of inventions. The use of the shell, ring-like, or floating gears enables me to produce this result.

Having thus described my invention, what I claim, and desire to secure by Letters Patent, is—

1. In a horse-power the combination of a supporting-frame, a supporting-track carried thereby having a semicircular end, a traveling chain supported by the said track and having a gear at its inner side, a shaft situated at a point inside the track and adjacent the semicircular ends thereof, a pinion upon the said shaft, and a ring-like gear having inner and outer gearing or cogs, the said ring-like gear situated between the said pinion and the traveling chain, and supported solely by the chain and the pinion, substantially as described.

2. In a horse-power, the combination of a supporting-frame, a supporting-track having a semicircular end, a traveling chain supported by the said track having a gear at its inner side, a shaft situated at a point inside the semicircular end and carrying a pinion, the shaft situated equidistant from the ends of the semicircular end, a ring-gear having inner and outer cogs situated between the said pinion and the chain, the gear being eccentric to the pinion and supported solely at its inner side by the pinion and solely at its outer side by the chain and held by the chain in engagement with the pinion, thereby constituting a floating gear, substantially as described.

3. In a horse-power, the combination of the supporting-frame, a supporting-track having a semicircular end, a shaft situated at a point inside the track and adjacent the semicircular end, a pinion carried by the shaft, a ring-gear having inner and outer cogs, the gearing between the ring-gear, pinion and chain, having side flanges to support the ring-gear against lateral movement, and the gear supported at its inner side solely by the pinion and held in engagement with the pinion solely by the external support of the chain, substantially as described.

4. The combination of a supporting-frame having a railway, a movable plane formed of lag-irons interlocking, shafts or rods passing through the interlocking ends of the lag-irons, supporting-wheels upon the outer ends of the said rods or shafts and resting upon the railway, lag wood or planks carried by the said lag-irons, a driving-shaft, a ring-like or floating gear surrounding the said shaft, the said gear having inner and outer teeth, the lag-irons having teeth upon their inner side, engaging the outer periphery of the ring-like gear, and a pinion upon the shaft engaging the teeth at the inner side of the ring-like gear, substantially as described.

5. In a horse-power, the combination of the supporting track or way having a flange at its upper side, the lag-irons having gear-teeth upon their inner side, a gear adapted to be engaged and driven thereby, rods passing through and supporting the lag-irons, supporting-wheels having concentric openings with abutting ends or shoulders, and the rods having their ends extending in the said openings and engaging or abutting against the abutments therein, for the purpose of preventing endwise movement, substantially as described.

6. In a horse-power, the combination of an inclined plane having a semicircular end, an endless chain supported by the incline and its semicircular end, a driving-shaft having a pinion situated inside of the said semicircular end, and at equal distances from the upper and lower portions of the said plane, and a ring-like gear situated between and supported wholly by the pinion and the chain, said gear having teeth upon its inner and outer side, substantially as described.

In testimony whereof I do affix my signature in presence of two witnesses.

JOSEPH C. LESLIE.

Witnesses:
 GILBERT A. DOW,
 CHARLES E. ALLEN.